(No Model.)
H. GRÜTTNER.
PNEUMATIC CYCLE TIRE.
No. 562,723. Patented June 23, 1896.
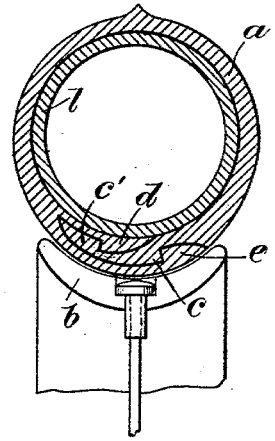
WITNESSES:
L. N. Legendre
M. F. Boyle
INVENTOR
Hermann Grüttner
BY
Thomas Drew Stetson
ATTORNEYS.

United States Patent Office.

HERMANN GRÜTTNER, OF BERLIN, GERMANY.

PNEUMATIC CYCLE-TIRE.

SPECIFICATION forming part of Letters Patent No. 562,723, dated June 23, 1896.

Application filed February 25, 1896. Serial No. 580,721. (No model.) Patented in Germany December 31, 1894, No. 82,801, and March 23, 1895, No. 83,390; in France April 25, 1895, No. 246,900; in England April 26, 1895, No. 8,316; in Belgium May 13, 1895, No. 115,587, and in Italy June 30, 1895, LXXVI, 176.

*To all whom it may concern:*

Be it known that I, HERMANN GRÜTTNER, a subject of the Emperor of Germany, residing in Berlin, in the Kingdom of Prussia, German Empire, have invented a certain new and useful Improvement in Pneumatic Cycle-Tires, of which the following is a specification.

The invention has been patented in other countries as follows: Germany, dated December 31, 1894, No. 82,801, and March 23, 1895, No. 83,390; France, dated April 25, 1895, No. 246,900; England, dated April 26, 1895, No. 8,316; Belgium, dated May 13, 1895, No. 115,587; and Italy, dated June 30, 1895, LXXVI, 176.

The invention relates to an improvement in pneumatic tires; and it consists in a new method of joining the edges of the tire-cover to each other. The peculiarity of this new method is that one of the edges is formed into two flaps, and the other is provided with hooks out of coincidence. The latter is placed between the two flaps which are formed accordingly. The hook-shaped edge being thus held fast between the two flaps, a very safe connection is obtained, and the joint can easily be opened or closed.

The figure in the accompanying drawing represents what I consider the best means of carrying out the invention. Said figure is a cross-section of the tire with the adjacent portion of the wheel.

Similar letters of reference indicate corresponding parts in the figure where they appear.

The essential feature consists in forming the one edge of the cover $a$ for the pneumatic tire $l$ of a hook shape, the hooks being out of coincidence, while the other edge consists of two lappets $d$ $e$, properly formed, which receive between them the hook-shaped edge. In the particular construction illustrated, one edge of the cover is hook-shaped on the inner side, one lappet, $d$, being made with a counter-hook, the other lappet, $c$, being thin and plain only serving to prevent by its pressure and frictional contact against $d$ the disengagement of the hooked joint. In either arrangement the hook $c$ is held so securely between the lappets $d$ and $e$, which in their turn are confined between the rim $b$ and pneumatic tire $l$, that any disengagement of the joint when the tire $l$ is fully distended is impossible.

The fitting of the cover upon the pneumatic tire is very simple and convenient. The cover $a$ is first fitted around the tire $l$ when this is only partially inflated, the hook $c$ being inserted between the lappets $d$ and $e$. The covered tire is then placed around the rim $b$ and the tire $l$ is fully inflated.

My covers can be used for all kinds of vehicles, velocipedes, bicycles, carriages, omnibuses, and the like.

I claim as my invention—

Connecting the covers edges of pneumatic tires by means of two hooks lying one behind the other, and two hooks arranged correspondingly at the two flaps of the other edges, so that two hook connections are obtained, arranged along different lines, substantially as described.

In testimony whereof I have hereunto set my hand, at Berlin, this 24th day of September, 1895, in the presence of two subscribing witnesses.

HERMANN GRÜTTNER.

Witnesses:
 EDUARD DALCHOW,
 PAUL KÜHNE.